United States Patent
Aila et al.

(10) Patent No.: US 8,472,455 B2
(45) Date of Patent: Jun. 25, 2013

(54) SYSTEM AND METHOD FOR TRAVERSING A TREELET-COMPOSED HIERARCHICAL STRUCTURE

(75) Inventors: Timo Aila, Helsinki (FI); Tero Karras, Helsinki (FI)

(73) Assignee: NVIDIA Corporation, Santa Clara, CA (US)

( * ) Notice: Subject to any disclaimer, the term of this patent is extended or adjusted under 35 U.S.C. 154(b) by 724 days.

(21) Appl. No.: 12/684,720

(22) Filed: Jan. 8, 2010

(65) Prior Publication Data
US 2011/0170557 A1 Jul. 14, 2011

(51) Int. Cl.
*H04L 12/28* (2006.01)

(52) U.S. Cl.
USPC .......................................... 370/408; 709/223

(58) Field of Classification Search
USPC .......................................... 370/408; 709/223
See application file for complete search history.

(56) References Cited

U.S. PATENT DOCUMENTS

| | | | |
|---|---|---|---|
| 6,795,441 B1 * | 9/2004 | Widmer et al. | 370/395.4 |
| 8,194,690 B1 * | 6/2012 | Steele et al. | 370/412 |
| 2005/0243829 A1 * | 11/2005 | Spencer | 370/394 |

OTHER PUBLICATIONS

Paul Arthur Navratil and Donald S. Fussell and Calvin Lin and William R. Mark. Dynamic Ray Scheduling to Improve Ray Coherence and Bandwidth Utilization. Proc. IEEE Symposium on Interactive Ray Tracing, 2007.

* cited by examiner

*Primary Examiner* — Wei Zhao
(74) *Attorney, Agent, or Firm* — Zilka-Kotab, PC

(57) ABSTRACT

A method for performing node traversal operations of a treelet-composed hierarchical structure includes allocating a queue for each of the plurality of treelets, each queue operable to store ray-states entering a respective one of the treelets. The method additionally includes determining that a ray-state exits a first treelet of the hierarchical structure and enters a second treelet of the hierarchical structure. The method further includes forwarding the ray-state entering the second treelet to a processing element for processing therein, wherein the queue allocated to store ray-states entering the second treelet is bypassed.

23 Claims, 5 Drawing Sheets

SYSTEM AND METHOD FOR TRAVERSING A TREELET-COMPOSED HIERARCHICAL STRUCTURE

BACKGROUND

The present invention relates to systems and methods for traversing hierarchical structures, and more particular to systems and methods for traversing treelet-composed hierarchical structures.

Hierarchical structures, such as logical tree structures, are known in many technical fields, and are employed to organize information in a logical form to facilitate storage and retrieval of the information. In a typical implementation, the highest node or "root" of the logical tree includes the most general information, with descendant nodes (i.e., child nodes, grandchild nodes, etc. moving away from the root node) providing additional detail as to a particular aspect of the information represented by the tree structure. It is, or course, desirable to navigate through the tree via the shortest path and/or in the shortest amount of time in order to store or retrieve information, and node traversal techniques for minimizing the time to perform these operations occupy engineers and scientists from a variety of different fields.

In the areas of graphics processing and rendering, ray tracing is a field which uses hierarchical structures for organizing information. Ray tracing involves a technique for determining the visibility of a primitive from a given point in space, for example, an eye, or camera perspective. Primitives of a particular scene which are to be rendered are typically located in nodes, and the nodes organized within a hierarchical tree. Ray tracing involves a first operation of "node traversal," whereby nodes of the tree are traversed in a particular manner in an attempt to locate nodes having primitives that may intersect a ray, and a second operation of "primitive intersection," in which a ray is intersected with one or more primitives within a located node to produce a particular visual effect. The hierarchical structure together with the primitives (together referred to as scene data herein) can be very large, and generally does not fit into a reasonably-sized cache.

In advanced rendering algorithms such as global illumination methods, most of the rays are incoherent. Rays can be considered coherent when it's possible to statically arrange the rays in "groups" so that most of the rays in a group access roughly the same parts of the scene data (and thus memory). In these cases caches can be effective, since the working set of a group of rays is small. However, groups of incoherent rays tend to diverge during hierarchical structure traversal, and the memory accesses are not localized, and therefore caches no longer help.

Navratil et al. in "Dynamic Ray Scheduling to Improve Ray Coherence and Bandwidth Utilization" proposes a solution to address this problem, in which scene data is partitioned into treelets of a hierarchical structure, with each treelet assigned to a queue. Whenever a ray moves to a different treelet during traversal, its processing is suspended and the ray and corresponding traversal state (collectively referred to as ray-state herein) are pushed into its respective queue. Once the treelet has been fetched into a L1 cache of the processing element operating upon the ray-state, almost all scene data requests are serviced from the cache before moving to the next queue. As a result, a very significant reduction in scene data-related memory traffic is made possible.

A difficulty with this approach, however, is that memory traffic caused by queue-related accesses becomes a significant problem, and consequently the potential for significant data throughput is severely diminished.

Accordingly, what is needed is an improved technique for performing node traversal operations in a treelet-composed hierarchical structure.

SUMMARY

A system and method for performing node traversal operations of a treelet-composed hierarchical structure are presented herein which addresses the foregoing difficulties. An exemplary method includes allocating a queue for each of the plurality of treelets, each queue operable to store ray-states entering a respective one of the treelets. The method additionally includes determining that a ray-state exits a first treelet of the hierarchical structure and enters a second treelet of the hierarchical structure. The method further includes forwarding the ray-state entering the second treelet to a processing element for processing therein, wherein a queue allocated to store ray-states entering the second treelet is bypassed.

These and other features of the invention will be better understood in view of the following figures and corresponding description of exemplary embodiments.

For clarity, previously identified features retain their reference indices in subsequent drawings.

DETAILED DESCRIPTION OF EXEMPLARY EMBODIMENTS

Figure 1:
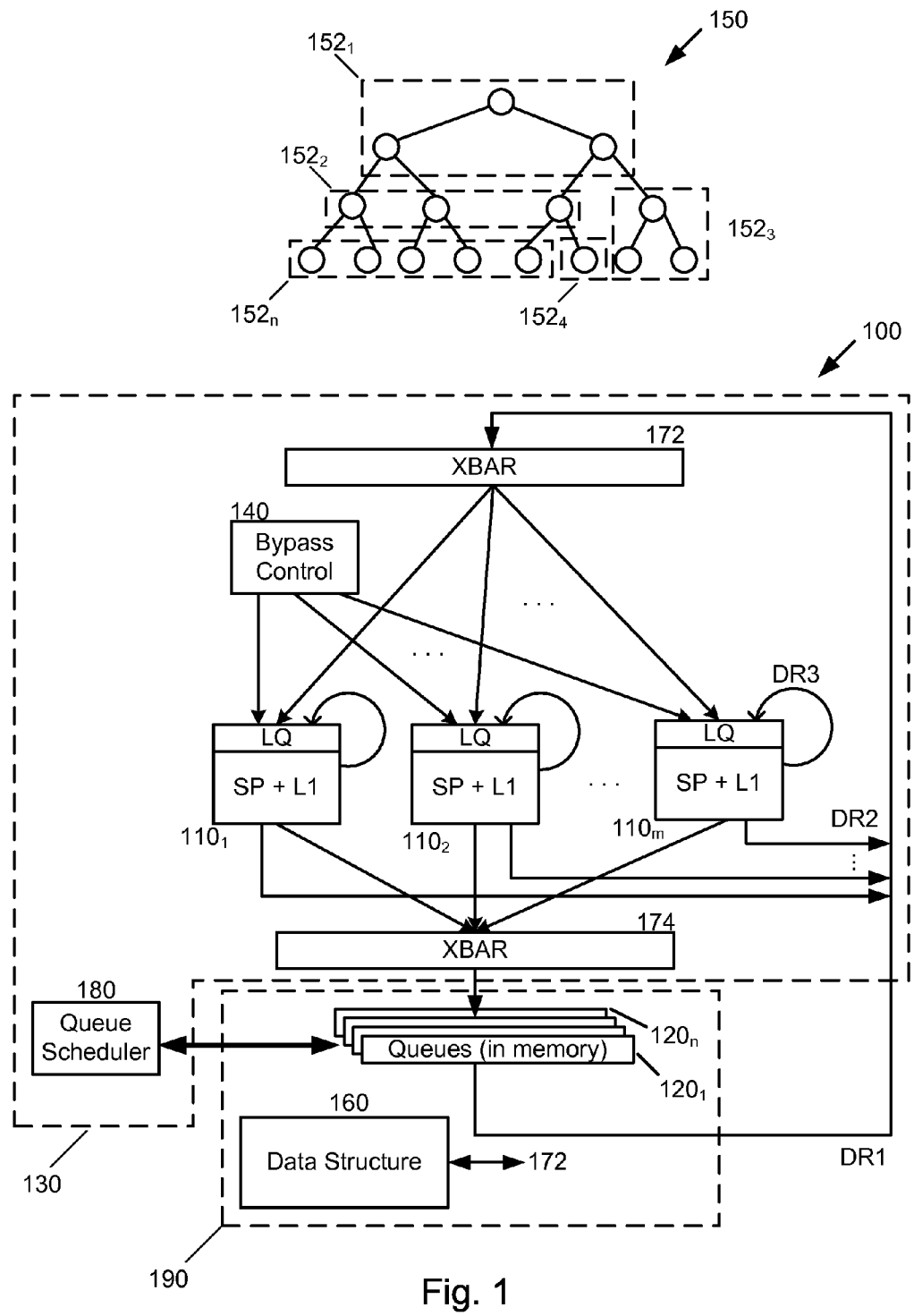
FIG. 1 illustrates a processor operable to perform node traversal operations of a treelet-composed hierarchical structure in accordance with one embodiment of the present invention.

FIG. 1 illustrates a processor 100 operable to perform node traversal operations within a treelet-composed hierarchical structure 150 in accordance with one embodiment of the present invention. The hierarchical structure 150 is composed of a plurality of n treelets $152_1$-$152_n$, each treelet composed of one or more nodes of the hierarchical structure 150. As shown, the treelets 152 may extend to one level (e.g., treelets $152_2$, 154 and $152_n$), or they may extend more than one level (e.g., treelets $152_1$ and $152_3$).

The processor 100 includes a processing block 130, and a memory block 190. The processing block 130 includes a plurality of m processing elements (PE) $110_1$-$110_m$. In one embodiment, the number of PEs is m and is less than the number of treelets n, in which case there is at least one fewer PEs 110 than treelets 152. In another embodiment, m is equal to n, i.e., the processing block 130 includes one processing element 110 for each treelet 152. Each PE $110_i$ includes a streaming processor $SP_i$, an $L1_i$ cache and a launch queue $LQ_i$. The $SP_i$ is operable to process one or more streams of ray-states supplied to the PE $110_i$. In one embodiment, the SP is a single stream processing element operable to processing a single ray-state, i.e., an instruction thread, supplied thereto.

In another embodiment the SP is a multiple stream processing element operable to concurrently process multiple ray-states supplied. The $L1_i$ cache is operable to store scene data corresponding to a treelet which the PE $110_i$ is presently processing, or has recently processed. The launch queue $LQ_i$ is operable to receive one or more incoming ray-states for processing by the PE $110_i$. As noted above, the term "ray-state" refers to a ray which is included within, i.e., which traverses nodes within, a particular treelet, and the corresponding traversal state of that ray. That is, the term "ray-state" is data which identifies a particular ray and the traversal state of that ray.

The processing block 130 further includes a bypass control unit 140, input and output crossbar switches 172 and 174, and a queue scheduler 180. The bypass control unit 140 is operable to control which of the PE 110 a ray-state is to be forwarded, as well as monitors status about the PEs 110, as will be further described herein. The input crossbar switch 172 permits routing of ray-states to one of the m PEs 110, and the output crossbar switch 174 permits forwarding of output ray-states to one of the plurality of n memory block queues 120, further described below. The processing block 130 further includes a queue scheduler 180 which controls the assignment of PEs 110 to memory queues 120 to minimize the number of assignment changes therebetween, and to maintain an optimal level of activity for each PE 110.

The memory block 190 includes a plurality of n memory queues $120_1$-$120_n$, and a data structure 160 representing the treelet-composed hierarchical structure 150. In a particular implementation, each PE 110 is assigned/bound to one memory queue 120 at any one time, and two or more PEs 110 may be bound to the same memory queue (e.g., when the number of PEs is less than the number of treelets).

Further particularly, each memory queue $120_j$ is operable to store ray-states which enter a particular treelet $152_j$. For example, when a ray-state exits a first/source treelet $152_i$ and enters a second/destination treelet $152_j$, a forwarding operation provides for pushing this ray-state into one of the memory queues 120 which has been allocated to store ray-states entering the second treelet. The memory queue 120 is then scheduled to supply this ray-state to the processing element operable to process ray-states entering or included within the second treelet. In the illustrated embodiment, one memory queue $120_j$ is allocated for each treelet $152_j$ (each, a count of n), and fewer PEs 110 are employed than treelets, i.e., m is less than n. In such an embodiment, one or more of the PEs 110 is operable to process ray-states for different treelets (at different times), and correspondingly, those one or more PEs 110 are bound (at different times) to different memory queues 120.

Memory block 190 is further operable to store a data structure 160 which represents the treelet-composed hierarchical structure 150. The data structure 160 includes the scene data, namely the nodes of the hierarchical structure 150 and the primitives located within one or more of the nodes. As each ray needs to visit some part of the data structure, traffic from the data structure 160 for a particular ray-state is very high, and arrangement of the hierarchical structure into treelets is a technique for reducing this level of traffic. In one embodiment, the processing block 130 resides on a single integrated circuit, and memory block 190 resides on a separate integrated circuit (e.g., a separate device, e.g., a DRAM-type memory device).

Exemplary, each PE 110 is operable to process any ray-state of any treelet within the hierarchical structure 150, although ray-states included within the same treelet are preferably routed to the same PE in order to maximize processing efficiencies for local ray-states. In other words, each PE has preference for processing ray-states included within a particular treelet ("preferred" ray-states), although each PE can process "non-preferred" ray-states (i.e., ray-states included within other treelets) as well. Analogously, each ray-state will have a preferred PE to which it is preferably routed, with the other PEs representing non-preferred PEs for that ray-state. The preferred PE is any PE for which the ray-state is a preferred ray-state. The processing preference of each PE may be assigned during start-up operations and/or may be dynamically re-assigned thereafter by the bypass control unit 140. In one embodiment, the processing preference of a PE can be re-assigned when the number of preferred ray-states a PE processes falls below a certain threshold. For example, a PE may have 1,000 or more instruction threads (each instruction thread representing a ray-state) in process at any time, whereby a minimum load of 500 ray-states is desired for reasonable efficiency of the PE. The PE may begin its processing with most/all of the 1,000 ray-states being of its preferred type, although the number of preferred ray-states the PE processes will decrease over time, as the preferred ray-states (instruction threads) are executed and terminate. At some point, the number of preferred ray-states will decrease to a point where the minimum load is not sustainable without the inclusion of non-preferred ray-states into the PE, and at a later point, the non-preferred ray-states may even out-number the preferred ray-states in the PE. Accordingly, the processing preference of the PE may be changed during this transition to a preference for processing ray-states included within another treelet. In one embodiment, the transition could happen as soon as the memory queue containing the preferred ray-states for a PE becomes empty. In another embodiment, the memory queues may become full, in which case it is necessary to transition one or more PEs to purge the queue that has become full to prevent deadlock. In yet another embodiment, this transition happens when a PE is processing fewer preferred (e.g., second treelet) ray-states than non-preferred ray-states, i.e., a ratio of 1:1 or lower of preferred to non-preferred ray-states. In yet another embodiment, the decision may be based on a fixed threshold value for the number of preferred ray-states being processed by the PE.

The bypass control unit 140 is operable to forward the ray-states to their preferred PEs 110 if certain conditions permit. For example, if a ray-state exits a first treelet $152_i$ and enters a second treelet $152_j$, the bypass control unit 140 determines whether the ray-state entering the second treelet (referred to as a "second treelet ray-state") can be forwarded to its preferred PE $110_j$. If so, the second treelet ray-state is forwarded to its preferred PE 110 via the input crossbar 172, and the memory queue 120 which is bound/allocated to the preferred PE 110 is bypassed. Certain conditions may arise in which a ray-state cannot be forwarded to its preferred PE 110, e.g., when the launch queue of the preferred PE 110 is full or when the input/output crossbars are unavailable, in which case an alternative procedure is determined, as will be further described below. Each PE 110 may be realized as a single instruction multiple data (SIMD) processor operable to execute instructions included within a predefined number of instruction threads corresponding to rays traversing nodes within a particular treelet. Other types of processing units may be used in alternative embodiments, e.g. multiple instruction multiple data (MIMD), single instruction single data (SISD), multiple instruction single data (MISD) architectures.

In an exemplary operation, a ray-state is supplied to a PE 110, which may be the ray-state's preferred PE or a non-preferred PE. The PE 110 continues to process the ray-state until the ray-state exits the first/source treelet $152_i$, and enters a second/destination treelet $152_j$. The second treelet ray-state is forwarded to a PE 110 which performs processing thereof, the forwarding operation occurring in one of two general ways:

(1) The second treelet ray-state is pushed to a memory block queue $120_j$ which is bound to (i.e., has been allocated to store ray-states entering) the second treelet $152_j$, the memory queue $120_j$ further operable to supply the second treelet ray-state to a PE 110 for processing thereby; or (2) The second treelet ray-state is forwarded to a PE 110 for processing thereby, whereby a memory queue 120 which has been allocated to store the second treelet ray-state is bypassed.

Forwarding operation (1) represents a baseline approach of forwarding a particular ray-state to a memory queue 120 that is bound to a PE 110, the PE 110 being operable to process the particular ray-state. This forwarding operation may be used in combination with (e.g., before or after) the forwarding operation (2). That is, a first ray-state may be forwarded in accordance with forwarding operation (2), and subsequently a second ray-state may be forwarded in accordance with forwarding operation (1).

Forwarding operation (2) represents an improved forwarding operation, in which a memory queue 120 that is bound to a particular treelet into which the ray-state enters is bypassed. This operation is described in general with respect to FIG. 2, and several detailed embodiments thereof are described with respect to FIGS. 3A-3D and 4.

Figure 2:
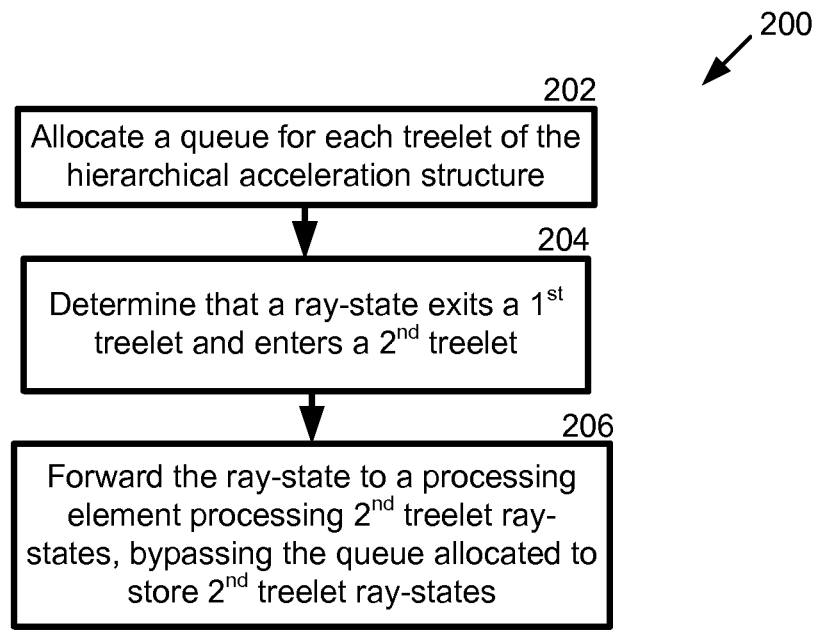
FIG. 2 illustrates a method of operating the processor shown in FIG. 1.

FIG. 2 illustrates an exemplary embodiment of the forwarding operation (2) described above. At 202, a plurality of memory queues 120 are allocated for storing ray-states, each queue allocated to store ray-states entering a respective one of the treelets 152. At 204, a determination is made that a ray-state exits a first one of the plurality of treelets $152_i$ (any one of the treelets $152_1$-$152_n$) and enters a second one of the plurality of treelets $152_j$ (another one of the treelets $152_1$-$152_n$) At 206, the ray-state entering the second treelet is forwarded to a processing element 110 for processing therein, wherein a memory queue 120 which is operable to store ray-states entering the second treelet is bypassed by the forwarding operation 206.

Operation 202 is carried out by allocating one memory queue 120 for each treelet 152 of the hierarchical structure 150, such operation being performed, e.g., under the control of a software driver. While the exemplary embodiment describes the allocation of one memory queue 120 for each treelet 152, an arbitrary number of treelets may be allocated to a memory queue 120 in alternative embodiments.

Operation 204 is carried out by the PE. Further particularly, each node contains an identifier of the treelet it belongs to, allowing the PE to know when the ray-state exits first treelet and enters second treelet.

Operation 206 represents the forwarding operation in (2) above, and can be carried out in one of several different embodiments. In some embodiments, the destination PE is a preferred PE for the second treelet ray-state. In other embodiments, the destination PE 110 is a non-preferred PE for the second treelet ray-state. In the latter case, forwarding the second treelet ray-state to a non-preferred PE can be more advantageous than pushing the ray-state to a memory queue in terms of the memory traffic created by such a forwarding operation. Irrespective of whether the destination PE is a preferred or non-preferred PE, the forwarded ray-state is processed by the PE which receives the ray-state. In particular, the ray-state is executed within the destination PE until the ray-state leaves the particular treelet, at which time the method of 200 repeats, wherein the exited treelet represents the afore-described "first" treelet and the destination treelet represents the afore-described "second" treelet.

Figure 3A:
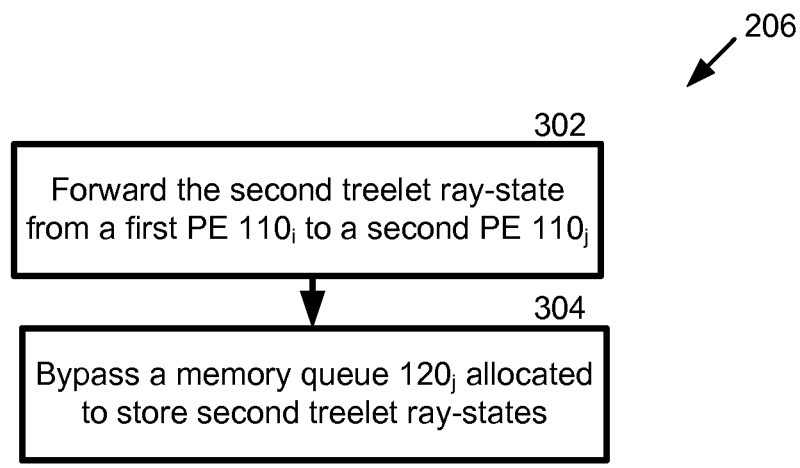
FIGS. 3A-3D illustrate exemplary embodiments of a ray-state forwarding operation shown in FIG. 2.

FIG. 3A illustrates a first exemplary embodiment of operation 206 in which two different PEs 110 are implemented. In this embodiment, the second treelet ray-state is forwarded from a first PE 110 to a second PE 110 (operation 302), bypassing a memory queue 120 which has been allocated to store ray-states entering the second treelet (operation 304). Further particularly, the second PE 110 is a preferred PE for the second treelet ray-state, as described above. The first processing element 110 may be operable as either a preferred PE, or a non-preferred PE for the ray-state's processing within the first treelet $152_i$.

Figure 3B:
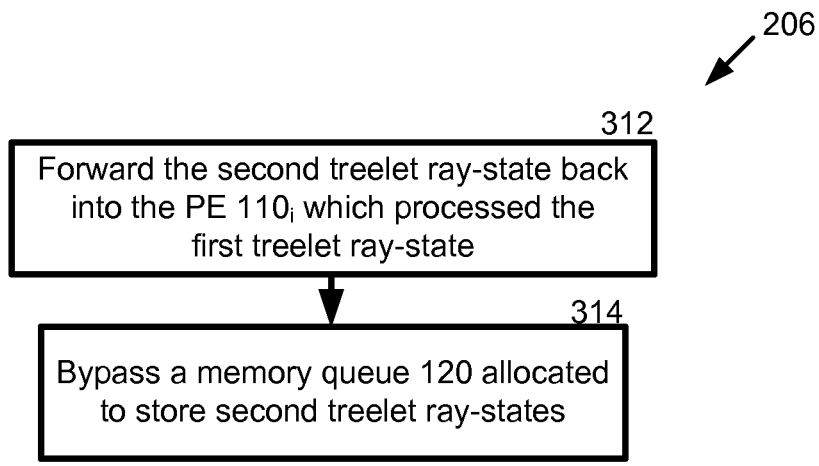

FIG. 3B illustrates a second exemplary embodiment of operation 206 in which a processing element 110 is first employed to process a ray-state during its traversal through the first treelet $152_i$, that processing resulting in the ray-state exiting a first treelet $152_i$ and entering a second treelet 152. The processing element PE 110 which processes the ray-state within the first treelet 152, may be a preferred PE, or a non-preferred PE for the first treelet ray-state. Subsequently, the processing preference of the same PE 110 is re-assigned to processing ray-states included within the second treelet $152_j$ (i.e., second treelet ray-states), and operation 206 involves forwarding the second treelet ray-state back into the same PE 110 for processing (operation 312), bypassing a memory queue 120 which has been allocated to store ray-states entering the second treelet (operation 314).

Figure 3C:
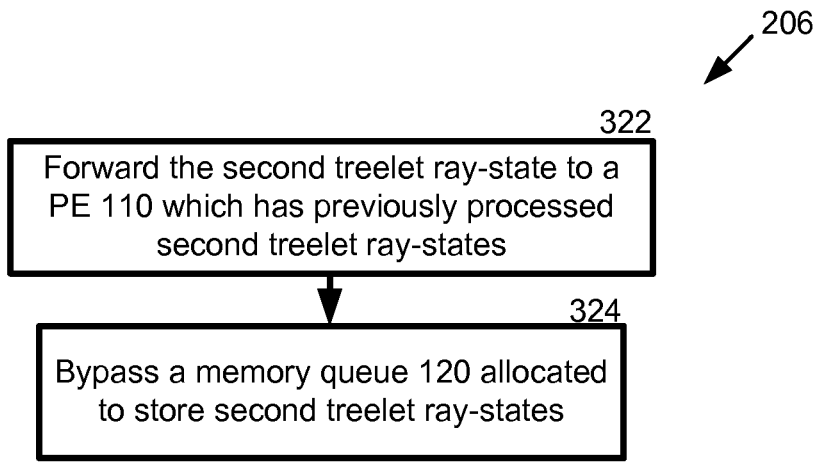

FIG. 3C illustrates a third exemplary embodiment of operation 206 in which the second treelet ray-state is forwarded to a PE which has been previously operable to process ray-states of the same treelet (operation 322), bypassing a memory queue 120 which has been allocated to store second treelet ray-states (operation 324). In this embodiment, the PE 110 to which the second treelet ray-state is forwarded is a non-preferred PE 110, as it is presently assigned to preferentially process ray-states within a treelet other than the second treelet $152_j$. This operation may be carried out conditionally, for example, if it is determined that none of the PEs $110_1$-$110_m$ is a preferred PE for the second treelet ray-state. In such an extension, operation 206 would include the operations of: (i) determining that none of the PE $110_1$-$110_m$ is a preferred PE for the second treelet ray-state, (ii) determining that a PE 110 has previously processed ray-states included within the second treelet $152_j$, and (iii) forwarding the second treelet ray-state to the PE 110 which previously processed ray-states included within the second treelet $152_j$, bypassing a memory queue allocated to store second treelet ray-states.

Exemplary of operation (ii) above, the bypass control unit 140 is operable to record previous assignments for one or more of the PEs $110_1$-$110_m$. For the PEs that were previously-assigned as preferred PEs for second treelet processing, the L1 cache of such PEs may retain at least a portion of the second treelet $152_j$. In such a case, it could be advantageous to forward the second treelet ray-state to one of these PEs instead of forwarding the second treelet ray-state to a memory queue bound to the second treelet $152_j$. The degree to which an L1 cache within each PE retains portions of the treelet $152_j$ depends upon the size of the L1 cache and how recently the PE operated as a preferred PE for the second treelet $152_j$. In a particular embodiment, the bypass control unit 140 examines a predefined number of assignments of the PEs, e.g., 1-10. Optionally, a time stamp may be used to determine whether forwarding ray-states to a previously-preferred PE is optimal. Subsequently, the second treelet ray-state is forwarded to the PE 110 which is identified as the most recently-assigned preferred PE. The forwarding processing may involve forwarding the second treelet ray-state between two different PEs as described in FIG. 3A, or feeding the second treelet ray-state back into the same PE as described in FIG. 3B.

In the foregoing exemplary embodiments of FIGS. 3A, 3B and 3C, the transitioning ray-state is forwarded to a PE whose L1 cache retains at least a portion of the (second) treelet (i.e., scene data corresponding to the second treelet) into which the transitioning ray-state enters. The advantages of such forwarding operations is that the retained portion of the treelet can be re-used to determine whether any primitives included within the treelet intersects the ray in question, as opposed to retrieving scene data for the entire treelet from the data structure 160. However, conditions may arise in which the transitioning ray-state cannot be forwarded to a PE under the conditions described in FIGS. 3A-3C. For example, the launch queue of the PE into which the transitioning ray-state is to be loaded may be full. In such an instance, pushing the transitioning ray-state to the memory queue bound to its preferred PE may be performed, although the memory traffic created in the execution of such an operation may be severe.

Figure 3D:
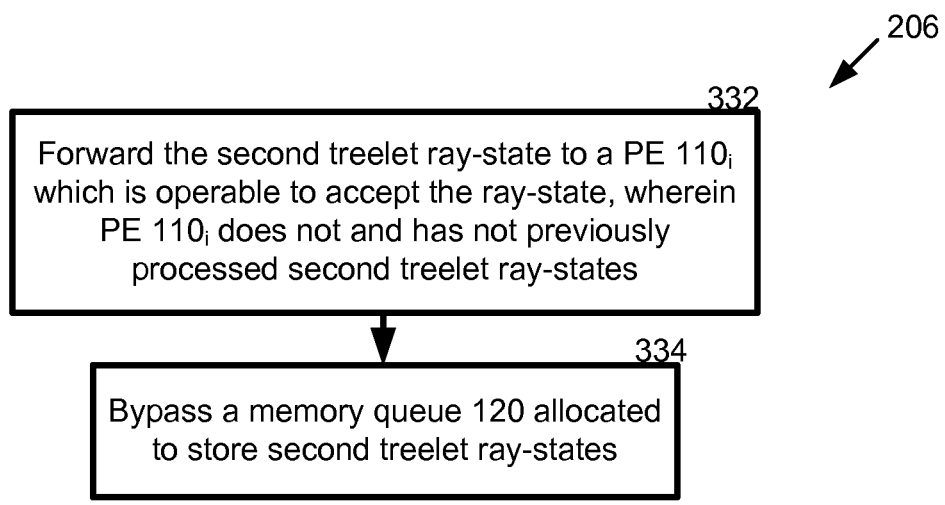

FIG. 3D illustrates a fourth exemplary embodiment of operation 206 which addresses the aforementioned condition, whereby the transitioning ray-state is forwarded to a non-preferred PE 110 which is able to accept the transitioning ray-state, even though the accepting PE is neither presently preferred, nor has it been previously preferred (e.g., per the conditions described in FIG. 3C) to process ray-states of the second treelet (operation 332). Exemplary, the accepting PE includes a launch queue of a capacity sufficient to accept the transitional ray-state, and the accepting PE processes the transitioning ray-state in normal course. The memory queue 120 which is allocated to store the second treelet ray-state is bypassed by the forwarding operation (operation 334). Further exemplary, the accepting PE may be different from the PE which previously processed the ray-state, or it may be the same PE 110 per the operations of FIGS. 3A and 3B, respectively.

Figure 4:
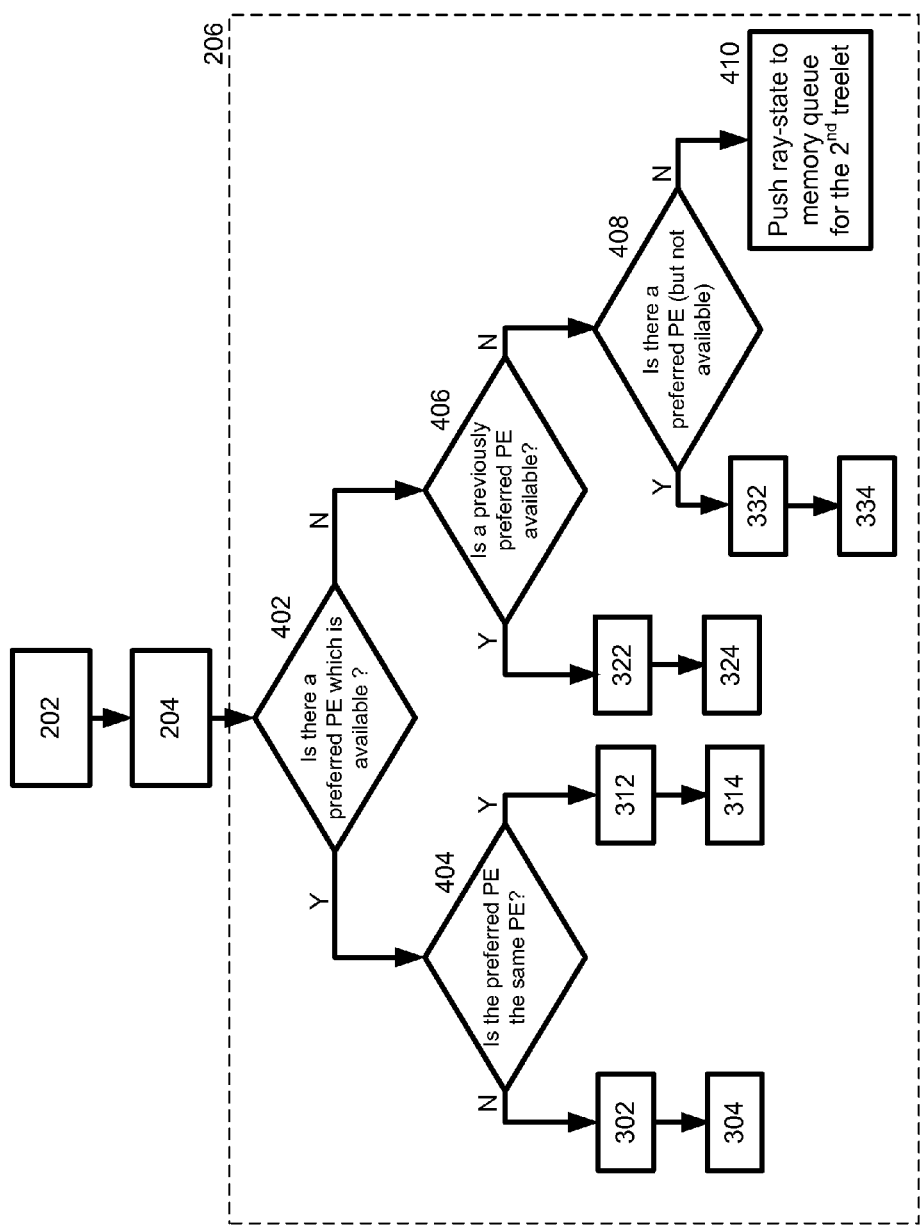
FIG. 4 illustrates a detailed exemplary embodiment of a ray-state forwarding operation in accordance with FIGS. 2 and 3A-3D of the invention.

FIG. 4 illustrates an exemplary detailed embodiment of method 200 in which the operations of FIGS. 2 and 3A-3D are included in accordance with the invention, and with previously-identified features retaining their reference indices. Operations 202 and 204 of FIG. 2 are as described above. At 402, a determination is made as to whether any of the operating PEs 110 is a preferred PE and available to receive the transitioning ray-state (a second treelet ray-state in the above illustrated embodiment). Exemplary of this operation, availability of a preferred PE is determined by the remaining capacity of its respective launch queue. In particular, the bypass control unit 140 may check to determine which of the operating PEs are processing a majority (or the largest number) of second treelet ray-states, such PE possibly being a preferred PE for the ray-state. Further exemplary, the bypass control unit 140 is operable to monitor launch queue capacity for each of the PEs 110, and can thus determine whether the preferred PE can accept a new ray-state for processing thereby. In another embodiment, availability of a PE is determined by [whether the transmission path to the preferred PE is available, e.g., whether such a transmission path exists or is congested.

If a preferred PE 110 is determined available at 402, at 404 a determination is made as to whether the preferred PE is the same PE in which the ray-state has been processed or a different PE. If the preferred PE is a different PE, operations 302 and 304 of FIG. 3A are carried out. If the preferred PE is the same PE, operations 312 and 314 of FIG. 3B are carried out.

If at 402 a preferred PE 110 is not available, at 406 a determination is made as to whether a PE that has been previously assigned as a preferred PE for the ray-state is available to accept the ray-state. Exemplary of this determination, the bypass control unit 140 may retain a history of the preference for each PE, and determine a PE has been assigned as a preferred PE if such an assignment was sufficiently recent, e.g., within the preceding 1-10 previous assignments. Alternatively, the bypass control unit 140 may check whether any one of more PEs have been assigned as a preferred PE for the ray-state within a predefined period of time, measured, e.g., by reference to a time stamp of such previous assignments. Further exemplary of this determination, the launch queue capacity of one or more of the previously-preferred PEs is checked (e.g., the bypass control unit 140 monitors the level of launch queues) to determine if there is capacity to receive a ray-state. Alternatively, a determination is made as to whether the ray-state can be routed to one or more of the previously-preferred PEs, i.e., whether the crossbar switches 172 and 174 are operable to provide the needed routing. If at 406, the determination is that a previously preferred PE is available/routable, the ray-state is forwarded thereto in accordance with operations 322 and 324 of FIG. 3C.

If at 406, the determination is made that a previously preferred PE is not available, the method continues at 408, where a determination is made as to whether there is a preferred PE for the ray-state, but the preferred PE is presently not available. If this is the case, the ray-state is forwarded to any available PE in accordance with operations 332 and 334 of FIG. 3D. If this is not the case (i.e., there is no preferred PE for the ray-state), the ray-state is pushed to the memory queue 120 which is bound to the second treelet (operation 410).

Figure 5:
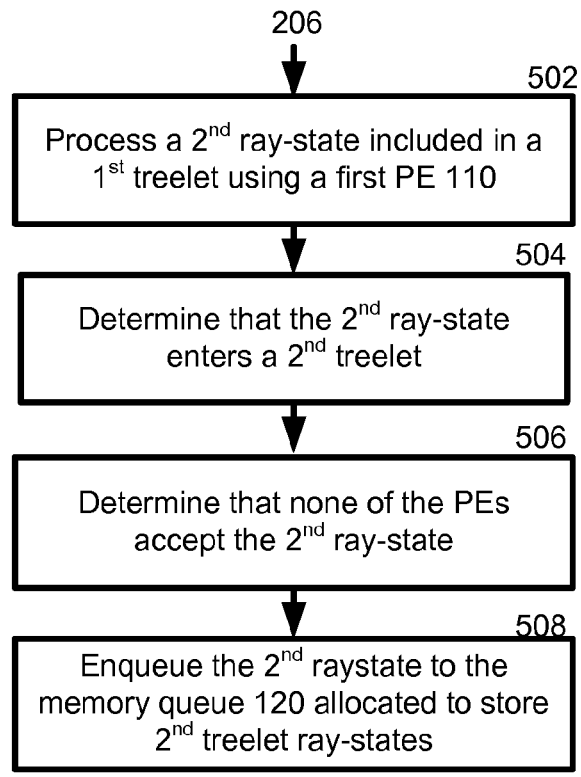
FIG. 5 illustrates a continuation of the method in FIG. 2 in accordance with one embodiment of the present invention.

FIG. 5 illustrates a further embodiment of the invention in which the baseline forwarding operation for a second treelet ray-state is performed subsequent to operation 206 shown in FIG. 2. After operation 206, a second ray-state included in a first treelet 152$i$ is processed using a first PE 110 (operation 502). The second ray-state is processed using a first PE 110 and is determined to exit the first treelet 152, and enters a second treelet 152$_j$ (operation 504). A determination is made that none of the PEs 110 will accept this ray-state (operation 506). Such a condition may occur if none of the PEs 110 have sufficient capacity in their launch queues to accommodate the ray-state. The new ray-state is subsequently enqueued to a memory queue 120 which has been allocated to store ray-states entering the second treelet in accordance with forwarding operation (1) above (operation 508).

Each of the forwarding operations illustrated in FIGS. 3A-3D is characterized by an effective bandwidth/data rate at which the ray-state can be communicated to its destination PE. For example, the baseline forwarding operation is characterized as having a first data rate DR1, the forwarding operation of FIG. 3A is characterized as having a second data rate DR2, and the forwarding operation of FIG. 3B is characterized as having a third data rate DR3, each data rate indicated in FIG. 1. As will be appreciated by the skilled person, each of these bandwidths/data rates are distinguished, and more particularly, forwarding operation corresponding to FIG. 3B has the fastest data rate of the three, as this forwarding operation does not involve forwarding the ray-state through the input/output crossbars 172 and 174, or pushing the ray-state to a memory queue 120, and thus data traffic associated with each of these connections is avoided. In the same vein, the baseline forwarding operation (1) has the slowest data rate of the three, and the forwarding operation corresponding to the method of FIG. 3A has an intermediate data rate of the three. Said in another way, the cost of pushing a ray-state into a memory queue 120 in the base line forwarding operation (1) is the highest, as the data traffic encountered will be the highest of the three forwarding operations due to data traffic occurring at each of the input and output crossbars 172 and 174 and at the memory queue 120. Said cost is the lowest for the forwarding operation of FIG. 3B in which the ray-state is fed back into the same processing element, bypassing traffic occurring at the input/output crossbars 172 and 174 and the memory queue 120. An intermediate cost is borne when the ray-state is forwarded to another of the processing elements 110 via the input crossbar 172 in the forwarding operation corresponding to FIG. 3A, albeit bypassing the memory queue 120. As such, the cost associated with each forwarding operation is determined as a function of the traffic encountered for each. As noted previously, a significant portion of traffic is generated at the memory queue 120, and thus forwarding operations corresponding to FIGS. 3A and 3B which bypasses the memory queue 120 advantageously overcome this problem.

The forwarding operation corresponding to FIG. 3C has an effective data rate which will be determined as a function of the hit rate of the PE's L1 cache which previously processed ray-states of the same treelet, and accordingly, the data rate for this forwarding operation is not immediately comparable to data rates DR1-DR3. Its effective data rate can be improved by limiting ray-state forwarding to PEs which very recently processed ray-states from the same treelet and/or increasing the size of the PE's L1 cache.

Similarly, the effective data rate for forwarding operation corresponding to FIG. 3D will depend upon the size of the PE's launch queues and the frequency with which PEs are re-assigned. Increasing these parameters would be expected to increase the effective data rate for this operation.

Implementation of the above baseline and improved forwarding methods allows the designer to more optimally balance data traffic generated within the processing system 100. Specifically, data traffic occurring between a PE 100 and a corresponding memory queue 120 can be alleviated by implementing one or more of the ray-state forwarding operations shown in FIGS. 3A-3D. The degree to which these forwarding operations can be implemented is limited in part by the size of the launch queues of each PE. Thus, the designer can balance data traffic occurring between PEs at a first level, as well as between a PE and its corresponding memory queue 120 at a second level in order to provide the highest total data throughput for the processing system 100.

As illustrated in FIG. 1, the present invention may be implemented as a processor 100 configured to perform node traversal operations of a treelet-composed hierarchical structure. In a particular embodiment, the processor 100 is vector/array-based processor (e.g., a SIMD architecture) operable to perform operations of multiple data elements simultaneously. The processor 100 may be implemented in various forms, for example, a central processing unit (CPU) intended to operate centrally within a computer or other programmable system. In another embodiment, the processor 100 is implemented as a graphics processing unit (GPU) which may be adapted for visual computing applications, or alternatively, as a general purpose GPU (GPGPU) implemented to carry out many functions normally performed by a CPU. In another embodiment, the processor may be implemented as a microprocessor embedded within a larger/more complex device or system, the microprocessor omitting memory or other peripheral components provided by the larger device/system. A non-exhaustive list of the aforementioned systems which may incorporate the processor of the present invention includes computers, workstations, cellular telephones, game consoles, and motherboards. The present invention can be implemented, e.g., to provide a graphics rendering process which is more computationally efficient compared to conventional techniques. Exemplary applications using the improved representation include computer games, flight simulation, geographic information systems, medical imaging, and other applications in which graphics rendering is used.

Figure 6:
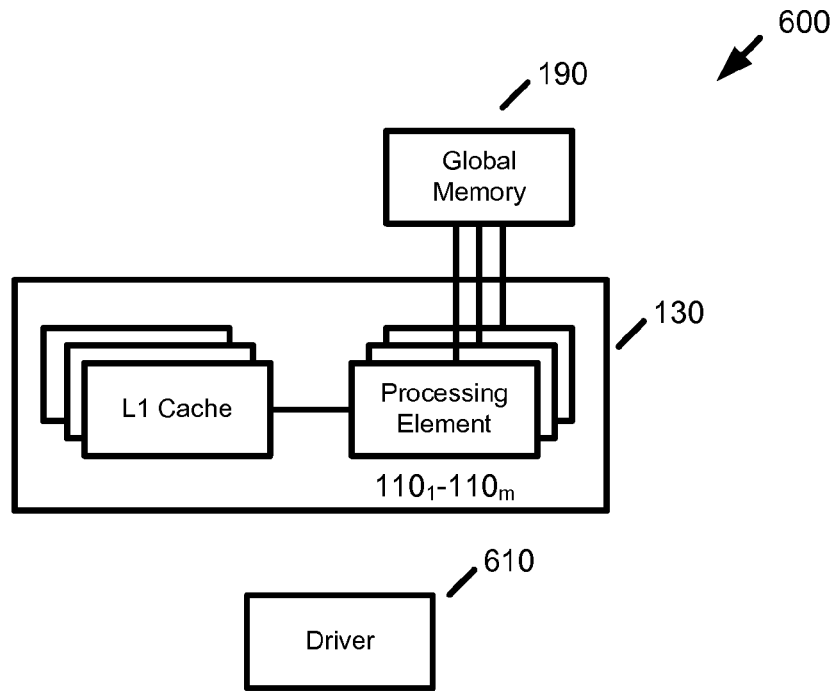
FIG. 6 illustrates an exemplary graphics processing subsystem employing the processor shown in FIG. 1.

FIG. 6 illustrates an exemplary graphics processing sub-system 600 in accordance with the present invention, with previously identified features retaining their reference indices. The graphics processing sub-system 600 includes the processing circuitry 100 shown in FIG. 1, including processing elements $110_1$-$110_m$ and their associated local L1 caches, as well as the memory block 190 which includes the memory queues 120 and the data structure 160. The sub-system 600 may further include one or more drivers 610 for controlling the operation of the sub-system 600 in accordance with the methods described herein. Further exemplary, the processor includes processor circuitry (analog and digital circuitry) operable to perform each of the operations described herein and shown in FIGS. 2, 3A-3D and 5. In one embodiment, the sub-system 600 is included within in a graphics card. In another embodiment, the sub-system 600 is included within the motherboard of a computer or workstation or on a game console. In another embodiment, the sub-system 600 is realized in an embedded system, such as in a cellular telephone.

Further exemplary, the memory block 190 is operable to store executable instructions for performing any of the operations illustrated in FIGS. 2, 3A-3E and 5. The memory 190 may take various forms, e.g., a removable disk, an embedded memory, etc., in volatile or non-volatile form, and may be included within a variety of different systems, e.g. a computer system, an embedded processor, a graphics processor, or graphics processing sub-system, such as a graphics card.

As readily appreciated by those skilled in the art, the described processes and operations may be implemented in hardware, software, firmware or a combination of these implementations as appropriate. In addition, some or all of the described processes and operations may be implemented as computer readable instruction code resident on a computer readable medium, the instruction code operable to control a computer of other such programmable device to carry out the intended functions. The computer readable medium on which the instruction code resides may take various forms, for example, a removable disk, volatile or non-volatile memory, etc.

The terms "a" or "an" are used to refer to one, or more than one feature described thereby. Furthermore, the term "coupled" or "connected" refers to features which are in communication with each other, either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serves to refer to one exemplary embodiment of a claimed feature, and the claimed feature is not limited to the particular embodiment referred to by the reference indicia. The scope of the claimed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method, comprising:
    allocating a queue for each of a plurality of treelets of a hierarchical structure, each queue configured to store ray-states entering a respective one of the plurality of treelets, each of the ray-states including data identifying a particular ray and a traversal state of the particular ray;
    determining that a ray-state exits a first treelet of the hierarchical structure and enters a second treelet of the hierarchical structure; and
    forwarding the ray-state entering the second treelet to a processing element for processing therein by:
        determining that none of a plurality of processing elements are configured to process ray-states included within the second treelet,
        determining that a processing element previously processed the ray-states included within the second treelet, and
        forwarding the ray-state to the processing element which previously processed the ray-states included within the second treelet, bypassing the queue allocated to store the ray-states entering the second treelet, such that the queue allocated to store the ray-states entering the second treelet is bypassed by the forwarding operation.

2. The method of claim 1, further comprising:
    processing the ray-state within the first treelet using a first processing element,
    wherein forwarding the ray-state entering the second treelet comprises forwarding the ray-state from the first processing element to a second processing element.

3. The method of claim 1, further comprising
    processing the ray-state within the first treelet using a first processing element,
    wherein forwarding the ray-state entering the second treelet comprises feeding the ray-state back into the first processing element, wherein subsequent to allocating the queues for each of the treelets of the hierarchical structure, the first processing element is further configured to process the ray-states of the second treelet.

4. The method of claim 2, wherein the second processing element currently processes the ray-states of the second treelet.

5. The method of claim 2, wherein the second processing element has previously processed the ray-states of the second treelet.

6. The method of claim 1, wherein forwarding the ray-state entering the second treelet comprises:
    determining that none of a plurality of processing elements are configured to process the ray-states included within the second treelet;
    determining that none of the processing elements previously processed the ray-states included within the second treelet;
    determining that the processing element is configured to accept the ray-state;
    forwarding the ray-state to the processing element which is configured to accept the ray-state, bypassing the queue allocated to store the ray-states entering the second treelet.

7. The method of claim 1, further comprising:
    determining that a second ray-state exits the first treelet of the hierarchical structure and enters the second treelet of the hierarchical structure;
    determining that none of a plurality of processing elements are configured to accept the second ray-state; and
    forwarding the second ray-state to the queue allocated to store the ray-states entering the second treelet.

8. A processor, comprising:
    a driver configured to allocate a queue for each of a plurality of treelets of a hierarchical structure, each queue configured to store ray-states entering a respective one of the plurality of treelets, each of the ray-states including data identifying a particular ray and a traversal state of the particular ray;
    first processing circuitry configured to determine that a ray-state exits a first treelet of the hierarchical structure and enters a second treelet of the hierarchical structure; and
    second processing circuitry configured to forward the ray-state to a processing element for processing therein, wherein the second processing circuitry is configured to:
        determine that none of a plurality of processing elements are configured to process the ray-states included within the second treelet,
        determine that a processing element previously processed the ray-states included within the second treelet, and
        forward the ray-state to the processing element which previously processed the ray-states included within the second treelet, bypassing the queue allocated to store the ray-states entering the second treelet, such that the queue allocated to store the ray-states entering the second treelet is bypassed by the forwarding to the processing element.

9. The processor of claim 8,
    wherein a first processing element processes the ray-state within the first treelet, and
    wherein the second processing circuitry is configured to forward the ray-state to a second processing element.

10. The processor of claim 8,
    wherein a first processing element processes the ray-state within the first treelet, and
    wherein the second processing circuitry is configured to feed the ray-state back into the first processing element, wherein subsequent to the driver allocating the queues for each of the treelets of the hierarchical structure, the first processing element is configured to process the ray-states of the second treelet.

11. The processor of claim 9, wherein the second processing element currently processes the ray-states of the second treelet.

12. The processor of claim 9, wherein the second processing element has previously processed the ray-states of the second treelet.

13. The processor of claim 8, wherein the second processing circuitry is configured to:

determine that none of a plurality of processing elements are to process the ray-states included within the second treelet;

determine that none of the processing elements previously processed the ray-states included within the second treelet;

determine that the processing element is configured to accept the ray-state;

forward the ray-state to the processing element which is to accept the ray-state, bypassing the queue allocated to store the ray-states entering the second treelet.

14. The processor of claim 8, further comprising third processing circuitry configured to:

determine that a second ray-state exits the first treelet of the hierarchical structure and enters the second treelet of the hierarchical structure;

determine that none of a plurality of processing elements are to accept the second ray-state; and forward the second ray-state to the queue allocated to store the ray-states entering the second treelet.

15. A computer program product, resident on a non-transitory computer readable medium, and configured to store instructions for performing node traversal operations of a hierarchical structure, the hierarchical structure organized as a plurality of treelets, wherein the instructions when executed performs a method comprising:

allocating a queue for each of the plurality of treelets of the hierarchical structure, each queue configured to store ray-states entering a respective one of the plurality of treelets, each of the ray-states including data identifying a particular ray and a traversal state of the particular ray;

determining that a ray-state exits a first treelet of the hierarchical structure and enters a second treelet of the hierarchical structure; and forwarding the ray-state entering the second treelet to a processing element for processing therein, by:

determining that none of a plurality of processing elements are configured to process the ray-states included within the second treelet, determining that a processing element previously processed the ray-states included within the second treelet, and forwarding the ray-state to the processing element which previously processed the ray-states included within the second treelet, bypassing the queue allocated to store the ray-states entering the second treelet, such that the queue allocated to store the ray-states entering the second treelet is bypassed by the forwarding operation.

16. The computer program product of claim 15, wherein a first processing element processes the ray-state within the first treelet, and wherein forwarding the ray-state entering the second treelet comprises forwarding the ray-state to a second processing element.

17. The computer program product of claim 16, wherein the first processing element processes the ray-state within the first treelet, and wherein forwarding the ray-state entering the second treelet comprises feeding the ray-state back into the first processing element, wherein subsequent to allocating the queues for each of the treelets of the hierarchical structure, the first processing element is configured to process the ray-states of the second treelet.

18. The computer program product of claim 16, wherein the second processing element currently processes the ray-states of the second treelet.

19. The computer program product of claim 16, wherein the second processing element has previously processed the ray-states of the second treelet.

20. The computer program product of claim 15, wherein forwarding the ray-state entering the second treelet comprises:

determining that none of a plurality of processing elements are configured to process the ray-states included within the second treelet;

determining that none of the processing elements previously processed the ray-states included within the second treelet;

determining that the processing element is configured to accept the ray-state;

forwarding the ray-state to the processing element which is configured to accept the ray-state, bypassing the queue allocated to store the ray-states entering the second treelet.

21. The computer program product of claim 15, further comprising:

determining that a second ray-state exits the first treelet of the hierarchical structure and enters the second treelet of the hierarchical structure;

determining that none of a plurality of processing elements are configured to accept the second ray-state; and forwarding the second ray-state to the queue allocated to store the ray-states entering the second treelet.

22. The method of claim 2, wherein each of the processing elements is assigned a processing preference during a start-up operation, and the processing preference assigned to the second processing element is dynamically reassigned in response to a number of preferred ray-states associated with the second processing element falling below a predetermined threshold.

23. The method of claim 1, wherein a time stamp is identified prior to forwarding the ray-state to the processing element which previously processed the ray-states included within the second treelet, the forwarding of the ray-state is based on the processing element which previously processed the ray-states included within the second treelet being determined to be a most-recently assigned processing element, and the determination that the processing element which previously processed the ray-states included is the most-recently assigned processing element is based on the time stamp.

* * * * *